May 6, 1969

R. W. BENNETT ET AL 3,442,134

FLUID PRESSURE SENSING AND CONDITION
INDICATING MECHANISM

Filed Dec. 12, 1966

INVENTORS
Ronald W. Bennett, &
Kenneth H. Dunlope

D.D. McGraw
ATTORNEY

United States Patent Office 3,442,134
Patented May 6, 1969

3,442,134
FLUID PRESSURE SENSING AND CONDITION INDICATING MECHANISM
Ronald W. Bennett, Miamisburg, and Kenneth H. Dunlope, Dayton, Ohio, assignors to General Motors Corporation, Detroit, Mich., a corporation of Delaware
Filed Dec. 12, 1966, Ser. No. 600,912
Int. Cl. G01l 7/16
U.S. Cl. 73—419
10 Claims

ABSTRACT OF THE DISCLOSURE

A dual fluid circuit brake system has pressures from each of the circuits acting on opposite ends of a shiftable piston so that the forces acting on the piston are balanced unless one of the fluid circuits suffers a pressure loss. A sufficient force unbalance due to pressure differences acting on the piston causes the piston to move and actuate a pressure condition indicating circuit. Operation of the mechanism can be checked by actuation of a device which moves the piston independently of the pressures in the fluid circuits. This device is disclosed as a test plunger arranged for movement manually or by a suitable power device to engage the piston and move it until the indicating mechanism is actuated.

---

The invention relates to mechanism which senses a plurality of fluid pressures in a comparative manner and having pressure condition indicating structure which is actuated when certain variations in the relationship of the sensed pressures exist. The invention more particularly relates to a fluid pressure sensing and condition indicating mechanism in which a plurality of fluid pressures are exerted on opposed piston areas of a movable piston and act so that the piston is maintained in a balanced position by the pressures throughout ranges of change of the pressures until and unless a pressure varies in relation to another pressure from that normally required to maintain such a balance. When a piston unbalance occurs due to the effective pressure unbalance, a pressure condition indicating mechanism is actuated. Mechanism embodying the invention includes means for moving the piston independently of the pressures acting thereon. The provision of such independently actuated mechanism provides an arrangement wherein the piston and the other portions of the sensing means and the condition indicating means may be checked for proper operation. In one embodiment the piston may be moved by a test plunger which is normally covered by a protective cap. The cap is removed and the plunger is manually actuated to move the piston to actuate the piston movement sensing means. In another embodiment a similar plunger is actuated by a power mechanism which may be remotely controlled. Such a power mechanism is preferably provided as a solenoid and armature arrangement with an operator closable switch positioned and connected so that when the switch is closed the solenoid is energized and the plunger is forced into engagement with the piston. The solenoid or other power mechanism provided is sufficiently powerful to move the piston from its normally centered or balanced position a sufficient distance to actuate the piston movement sensing mechanism and therefore the condition indicating means. It is another feature of the invention to provide an electrical switch which is actuated by piston movement through an intermediate structure, with the switch and the intermediate structure being so positioned that they are not at any time exposed to pressures being sensed. The switch is preferably so mounted that it is readily removable and replaceable without disturbing the piston or the structure intermediate the piston and the switch. In its preferred usage, mechanism embodying the invention is provided in a multiple fluid circuit brake system so that the mechanism senses pressures in the different fluid circuits and actuates the condition indicating means when pressure in one of the circuits is out of balance relative to the other circuit pressure or pressures in the brake system. Although the mechanism is shown in a dual fluid circuit brake system, the principles of the invention may be utilized in brake systems having additional fluid circuits, it only being required that piston areas be exposed to various fluid circuit pressures in such a manner that, when the brake system is actuated, the pressures normally maintain the piston in balance to such an extent that the indicating means is not actuated, and when a pressure is out of balance relative to the other pressures the piston will be moved.

Figure 1:
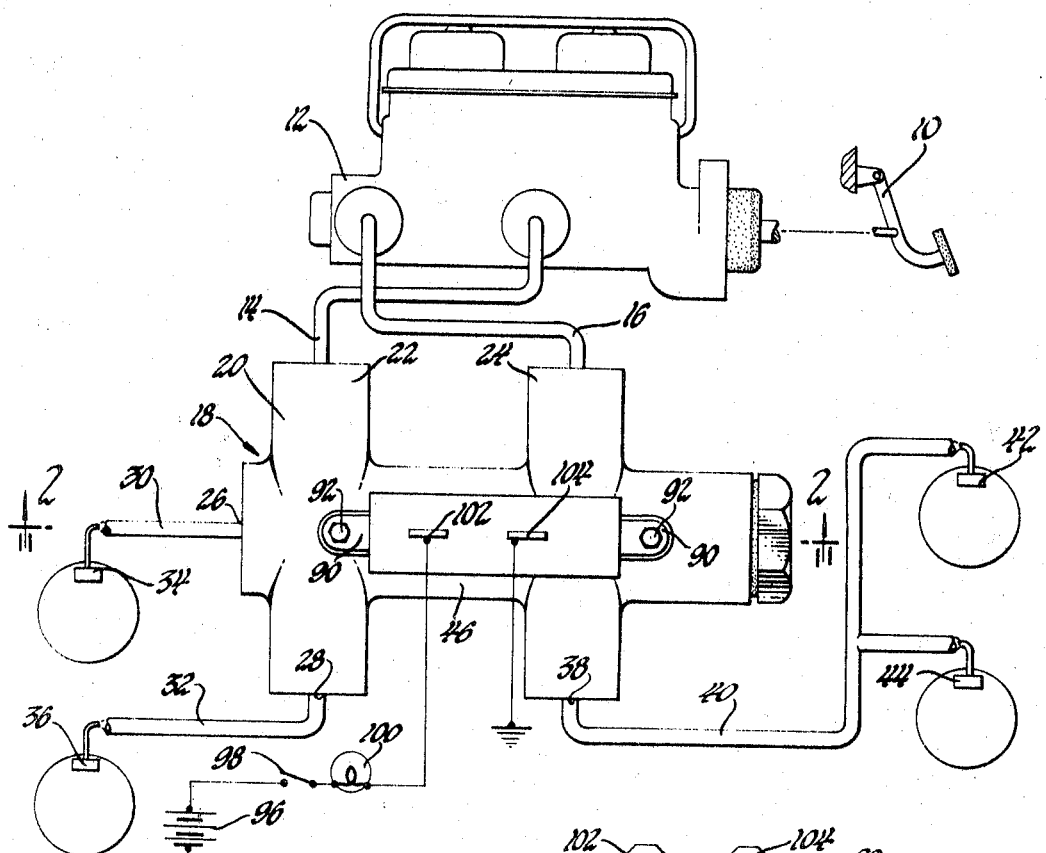
FIGURE 1 is a schematic representation of a brake system having mechanism therein embodying the invention.

The brake system includes a brake pedal 10 which actuates a dual master cylinder 12 to pressurize brake fluid in two separate circuits of a vehicle braking system. The front wheel brake circuit is supplied with pressurized fluid from the master cylinder through conduit 14, and the rear wheel brake circuit is supplied with pressurized fluid through the conduit 16. The fluid pressure sensing mechanism 18 includes a housing 20 which has inlets 22 and 24 respectively fluid connected with conduits 14 and 16. The housing is provided with front brake outlets 26 and 28 respectively fluid connected by conduits 30 and 32 to the front wheel brake mechanisms 34 and 36. The housing 20 also has an outlet 38 fluid connected with the rear brake conduit 40 which in turn is fluid connected to the rear wheel braking mechanisms 42 and 44. The housing 20 has a cylinder body section 46 in which is provided a bore 48. One end of the bore forms the outlet 26. The other end of the bore has a reduced diameter section 50 opening into an enlarged recess 52. A piston assembly 54 is reciprocably received in bore 48 between the outlet 26 and the reduced diameter section 50 so as to divide the bore into chambers 56, 58 and 60. Chamber 56 is fluid connected with inlet 22 and outlets 26 and 28, and chamber 58 is fluid connected with inlet 24 and outlet 38. The piston is formed with spaced lands 62 and 64 which are beveled at their adjacent edges 66 and 68, with the land beveled edges and the reduced diameter portion of the valve joining these lands and the center portion of the bore defining chamber 60. Each land is provided with a fluid pressure seal, 70 and 72 respectively, so that fluid pressures in chambers 56 and 58 are prevented from entering chamber 60. Piston centering springs 74 and 76 are preferably provided as yieldable compression coil springs and are positioned in chambers 56 and 58 so that they continually urge the piston assembly 54 to the center or balance position shown. Assuming the pressures generated in conduits 14 and 16 to be of the same value, the effective piston areas 78 and 80 are identical. Thus the bore illustrated has a constant diameter. In some conditions of operation an unbalanced opposed area piston may be required when the fluid pressures being sensed have a differential value.

A radially extending passage 82 in the housing connects with chamber 60 and has a switch actuating plunger 84 mounted therein for reciprocal movement. The end of the plunger 84 extending into chamber 60 is beveled to provide a cam surface cooperating with the bevels formed on the lands 62 and 64, which provide cooperating cam surfaces so that when the piston assembly is moved sufficiently far to the left or to the right because of a pressure unbalance condition, the plunger is moved upwardly. A stop seal and mounting arrangement 86 may be provided for mounting the actuating plunger 84 in the passage 82. A switch assembly 88 is mounted on the housing 20 by suitable means such as lugs 90 and screws 92. The switch illustrated is of the type commonly known as a microswitch and may be any such commercially available switch of a suitable nature. The switch has a plunger 94 which is in engagement with the actuating plunger 84 so that only slight outward movement of plunger 84 is required to actuate the switch and close an indicating circuit. An indicating circuit is schematically illustrated as including a source of electrical energy 96, a switch such as a vehicle ignition switch 98, indicating means such as the electrical lamp 100, and suitable electrical leads connecting through the switch terminals 102 and 104 to ground. It can be seen that when the pressures generated in the master cylinder 12 are normally in balance, they act on opposed areas of the piston assembly 54 to keep the piston assembly in balance and on its center position established by the yieldable piston centering springs 56 and 58. If, however, the pressure in one conduit from the master cylinder is sufficiently greater than the pressure from the other conduit, the piston will be unbalanced toward the chamber having the least pressure and when it is moved a predetermined amount will move the actuating plunger upward, actuating the micro-switch 94 to close it. Assuming the ignition switch 98 to be closed, the indicating means 100 will be energized, indicating to the vehicle operator the fact that there is a pressure unbalance in the different brake circuits.

Figure 2:
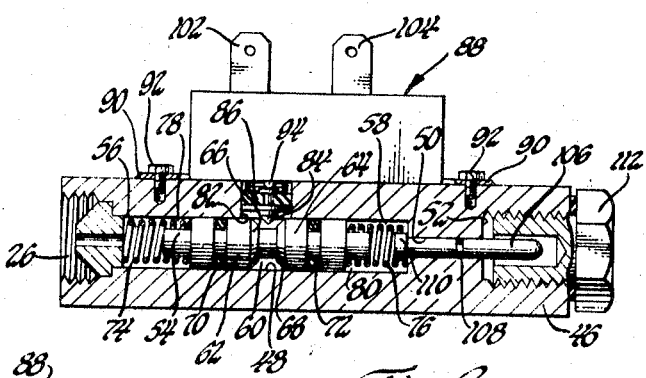
FIGURE 2 is a cross section view of the multiple fluid pressure sensing mechanism contained in the system of FIGURE 1, taken in the direction of arrows 2—2 of that figure.

A test plunger 106 extends through the reduced diameter section 50 of the bore 48 and has a seal 108 which fluid pressure seals chamber 52 from chamber 58. The inner end of the plunger 106 is provided with an enlarged head 110 extending within the chamber 58 and engageable with the piston assembly 54 so that movement of the plunger 106 toward the piston for a sufficient distance will move the piston leftwardly, as seen in FIGURE 2, to actuate the switch 88. Movement of the plunger may be accomplished manually by first removing the protective cap 112 which is illustrated as being threaded into the outer portion of chamber 52 and fitting over plunger 106. The ability to manually move the plunger against the piston will enable one inspecting the mechanism to determine the freedom of movement of the piston and also the fact that the indicating circuit components are operable.

Figure 3:
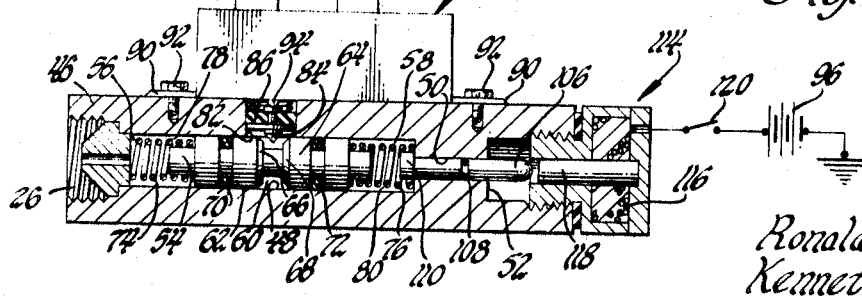
FIGURE 3 is a cross section view similar to FIGURE 2 showing a modification of the multiple fluid pressure sensing mechanism embodying the invention.

The modified assembly shown in FIGURE 3 is identical to that of FIGURE 2 with the exception that the protective cap 112 is replaced by a solenoid assembly 114. This assembly has a solenoid winding 116 formed therein about an armature 118. A suitable winding energization circuit including the electrical source 96 and a switch 120 is provided. When the switch 120 is closed to energize the winding 116, the armature 118 is moved leftwardly against the test plunger 106 with sufficient force to move the piston assembly 54 leftwardly a sufficient distance to actuate the indicating circuit. When the solenoid winding is de-energized, the piston centering springs 74 and 76 will return the piston to the center position. They will also move plunger 106 rightwardly at least a sufficient distance to center the piston assembly, and this movement will be transferred to armature 118. The first time that pressure is thereafter generated in chamber 58, the effective area of plunger 106 exposed to that pressure will be acted upon by that pressure to move the plunger 106 rightwardly to the position shown in FIGURE 3. This will also return the armature 118 rightwardly so that it is again in its retracted or de-energized position.

We claim:
1. Sensing and indicating means for a plurality of pressurized fluids comprising:
a housing provided with a bore,
a floating piston in said bore,
yieldable centering means for said piston,
pressurized fluid inlet and outlet means connected with said bore to expose oppositely acting piston areas to different pressurized fluids
whereby when the fluid pressures acting on said areas are in balance said piston remains in a centered position
and when the fluid pressures acting on said areas are unbalanced said piston is moved in said bore,
means sensing off-center movement of said piston beyond a predetermined amount,
indicating means activated by said sensing means and indicating a pressure imbalance,
and means selectively moving said piston off-center in said bore independently of the fluid pressures.
2. The subject matter of claim 1,
said piston selectively moving means including a movable member extending into said bore and accessible externally of said housing and engageable with said piston in force transmitting relation to move said piston.
3. The subject matter of claim 2,
said movable member being a plunger movable through a stroke sufficient to activate said sensing means.
4. The subject matter of claim 3,
said plunger extending through one end of said bore and having an enlarged head in said bore adjacent said piston and a reduced diameter body slidably engaging a reduced diameter section of said bore and extending outwardly thereof,
and fluid sealing means between said housing and said plunger reduced diameter body preventing fluid leakage from the inside of said bore through said bore reduced diameter section.
5. The subject matter of claim 4, said housing having a protective cap normally covering said plunger and removable to permit access to said plunger for manual plunger actuation.
6. The subject matter of claim 1, further comprising power means selectively and remotely energizable to move said piston selectively moving means and activate said indicating means through actuation of said sensing means.
7. The subject matter of claim 6, said power means including a solenoid.
8. The subject matter of claim 7,
said solenoid having a movable armature exerting a force on said piston selectively moving means when the winding of said solenoid is electrically energized.
9. The subject matter of claim 1,
said sensing means comprising a cam actuated reciprocable plunger and a switch opened and closed by movement of said plunger, said piston having spaced lands thereon with the adjacent land edges being beveled and forming cams engageable with said plunger, said piston having fluid pressure seals preventing fluids from entering the space between said beveled spaced lands.

10. The subject matter of claim 9,
said switch being removably attached to said housing as a unit independently of said plunger and said fluids.

References Cited

UNITED STATES PATENTS

| | | | |
|---|---|---|---|
| 2,772,409 | 11/1956 | Reid | 340—236 |
| 3,168,008 | 2/1965 | Bingel | 92—131 |
| 3,182,630 | 5/1965 | Claeys | 73—419 |
| 3,358,446 | 12/1967 | Wortz | 60—54.5 |

S. CLEMENT SWISHER, *Acting Primary Examiner.*

DENIS E. CORR, *Assistant Examiner.*

U.S. Cl. X.R.

200—82